United States Patent Office 2,948,625
Patented Aug. 9, 1960

2,948,625

ANTI-ICING FLUID FOR USE IN FREEZING RAIN

William E. MacKenzie, Collingdale, Pa., assignor to the United States of America as represented by the Secretary of the Navy No Drawing. Filed July 23, 1959, Ser. No. 829,157

2 Claims. (Cl. 106—13)

(Granted under Title 35, U.S. Code (1952), sec. 266)

The invention described herein may be manufactured and used by or for the Government of the United States of America for governmental purposes without the payment of any royalties therein or therefor.

This invention relates to a composition for preventing the formation or accretion of ice on solid surfaces. Since there are insufficient hangar accommodations for many of the military aircraft, the planes when not in use are stored outside. Consequently, during snow and ice storms, they become covered with ice. It is a well known fact in the prior art that it was difficult to remove ice that had formed on propeller domes, rods, guides, rails, or wires of the aircraft. Many de-icing materials have been developed to prevent the accumulation of ice on these surfaces; however, a problem arose in that it was difficult to keep these protective compositions on the above structures due to the rinsing effect of the rain or snow.

An object of this invention is to provide a composition which is capable of withstanding the rinsing effect of water.

Another object of this invention was to provide an anti-icing material that could easily be brushed or sprayed onto the upper surfaces of aircraft prior to or during freezing rain or other ice forming conditions.

Yet other objects of the invention are to provide an anti-icing coating for weather exposed surfaces which is effective in sub-freezing temperatures to at least —15° F.; which will prevent reformation of ice after removal for considerable time periods dependent upon the amount of precipitation encountered; which shall have no adverse effect on materials used in aircraft construction; which is non-inflammable and non-toxic to any considerable extent; which has a low pour point; and which may be readily prepared for use.

Other objects and many of the attendant advantages of this invention will be readily appreciated as the same becomes better understood by reference to the following detailed description:

The anti-icing composition of this invention which meets the requirements as mentioned in the stated objects is made up of two parts. The first part contains an oil soluble long chain fatty acid ester or partial ester dissolved in white mineral oil. The second part consists of a de-icing composition having the following parts:

| | Percent by weight |
|---|---|
| Lithium chloride | 97.0 |
| Carboxy methyl cellulose | 0.2 |
| Morpholine | 0.5 |
| Wetting agent | 0.5 |
| Arquad 16 | 1.0 |

Of these parts, the purposes of the carboxymethyl cellulose in the composition is to supply body by increasing the viscosity of the aqueous solutions. The requirement of this substance is that it be compatible with the concentrated salt solution of the lithium chloride so as to avoid precipitation.

The wetting agent aids in spreading the de-icing material over the desired surfaces. This particular ingredient is not mandatory in those cases where the surfaces are ice coated as the de-icer will spread readily. A wetting agent which was found to give good results is one known under the trade name "Triton X-100." This product is an alkylated aryl polyether alcohol, or, more specifically iso-octyl phenyl ether of of polyethylene glycol.

The essential de-icing agent in the composition is lithium chloride and, while other salts of lithium, such as the bromide and acetate, are useful none completely approach the chloride in its unique effectiveness as a de-icer. The lithium chloride brine also contains a corrosion inhibitor, potassium chromate.

The morpholine is an amine derivative or more specifically imide oxide having the following formula

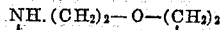

$$NH \cdot (CH_2)_2 - O - (CH_2)_2$$

The function of this ingredient is to inhibit vapor phase corrosion.

Arquad 16 is an alkyl quaternary ammonium salt in which the average composition has the following alkyl groupings: Hexadecyl 90%, octadecyl 6%, octadecenyl 4%. This compound is desirable to inhibit copper corrosion.

When applied in the form of the specified composition to exposed surfaces, the de-icing material was rendered ineffective due to the rinsing effect of the water. In order to overcome this ineffectiveness, the present anti-icing composition was developed.

In the preferred embodiment of this invention, five parts by weight of sorbitan sesquioleate are dissolved in twenty-three parts by weight of a white mineral oil having a viscosity of 125 to 135 Saybolt Universal seconds. This is designated as component A in the two part system. Component B is the de-icing composition described above.

Component B is slowly added to component A with hand or mechanical stirring. The resultant emulsion is a delicately belanced water in oil emulsion whereby the oil surrounds the de-icing fluid and thereby presents a water resisting surface. The stability is such that frequently the oil film surrounding the de-icing fluid becomes discontinuous and allows the de-icing fluid to contact any ice film. This ice is then melted by a lowering of the freezing point. The mixture of melted ice and de-icing fluid maintains a liquid layer between the aircraft surface and the ice coating. The ice, regardless of its thickness, may then be easily lifted or brushed from the surface. The final proportions of the anti-icing fluid consists of 75 parts by weight of component B and 27 parts by weight of component A.

The following tests were conducted on this anti-icing composition:

A coat of this composition was applied to the horizontal stabilizer and to the wing of an aircraft. The aircraft was then allowed to stand in freezing rain for approximately 40 minutes. The ice did not adhere to any treated surface. The surfaces were then exposed for 23 hours. The aircraft was completely covered with ice. The untreated surfaces had ice formed upon them up to 5/16" thick. However, the ice did not adhere to the treated surfaces and could be easily wiped off. The ambient temperature was 27° F.

In another test the roof of a small unpainted aluminum outdoor storage cabinet having a slant of approximately 45° was used as a test surface. The ambient temperatures ranged between 26° F. and 30° F. and rain changed immediately to ice on striking exposed surfaces. At the start of the test, one-quarter inch of ice had already accumulated. This ice was chipped away from an area twelve inches square with the bottom side at the edge of the eve. With this arrangement, the anti-icing fluid was free to drain from the surface.

The anti-icing composition was brushed on the bare area and on an equivalent size iced section nearby for a de-icing property check. The rain ceased after thirty minutes and the surfaces were examined. No ice had accumulated on the cleared test area and a thin layer of fluid was found to remain. Some of the fluid had seeped under the ice of the adjacent area and loosened the bond so that the ice was easily removed. After about thirty minutes the freezing rain re-started and lasted 30-40 minutes. The rain turned to snow and continued for two additional hours. No ice had formed on the treated cleared area prior to the snowfall. During the snowfall, about two inches of snow accumulated over the entire surface of the roof. This snow was brushed away. The treated area still had a very thin protective layer of anti-icing fluid. The ice in the surrounding areas had increased during the storm to over ½ inch.

Obviously many modifications and variations of the present invention are possible in the light of the above teachings. It is therefore to be understood that within the scope of the appended claims the invention may be practiced otherwise than as specifically described herein.

What is claimed is:

1. An anti-icing composition consisting essentially of 75 parts by weight of an aqueous solution consisting essentially of 97% by weight of lithium chloride brine, 0.2% by weight of carboxy methyl cellulose for increasing the viscosity of the aqueous solution, 0.5% by weight of imide oxide to inhibit vapor phase corrosion, 1% by weight of an alkyl quaternary ammonium salt as a corrosion inhibitor; and 27 parts by weight of a mixture consisting of 5 parts by weight of sorbitan sesquioleate and 23 parts by weight of a white mineral oil having a viscosity of 125 to 135 Saybolt Universal seconds whereby a delicately balanced water in oil emulsion is formed to present a water resisting surface so that the resulting composition is resistive to the rinsing effect of rain and snow.

2. A composition according to claim 1 including 0.5% by weight of iso-octyl phenyl ether of polyethylene glycol to aid in spreading the aqueous solution over the desired surfaces.

References Cited in the file of this patent

UNITED STATES PATENTS

| | | |
|---|---|---|
| 2,373,727 | West et al. | Apr. 17, 1945 |
| 2,451,814 | Dissel et al. | Oct. 19, 1948 |
| 2,731,353 | Fain et al. | Jan. 17, 1956 |